(12) United States Patent
Llamas Virgen et al.

(10) Patent No.: US 11,134,081 B2
(45) Date of Patent: Sep. 28, 2021

(54) AUTHENTICATION MECHANISM UTILIZING LOCATION CORROBORATION

(71) Applicant: International Business Machines Corporation, Armonk, NY (US)

(72) Inventors: Paul Llamas Virgen, Zapopan (MX); Carolina Garcia Delgado, Zapopan (MX); Humberto Orozco Cervantes, Tonalá (MX)

(73) Assignee: International Business Machines Corporation, Armonk, NY (US)

(*) Notice: Subject to any disclaimer, the term of this patent is extended or adjusted under 35 U.S.C. 154(b) by 147 days.

(21) Appl. No.: 16/670,298

(22) Filed: Oct. 31, 2019

(65) Prior Publication Data

US 2021/0136066 A1 May 6, 2021

(51) Int. Cl.
*H04L 29/06* (2006.01)

(52) U.S. Cl.
CPC ........ *H04L 63/0876* (2013.01); *H04L 63/101* (2013.01); *H04L 63/107* (2013.01)

(58) Field of Classification Search
CPC . H04L 63/101; H04L 63/107; H04L 63/0876; H04L 63/14; H04L 63/1416;
(Continued)

(56) References Cited

U.S. PATENT DOCUMENTS

| | | |
|---|---|---|
| 6,978,023 B2 | 12/2005 | Dacosta |
| 6,988,208 B2 | 1/2006 | Hrabik et al. |

(Continued)

FOREIGN PATENT DOCUMENTS

| | | |
|---|---|---|
| CN | 104969231 A | 10/2015 |
| CN | 105723392 A | 6/2016 |

(Continued)

OTHER PUBLICATIONS

Ashibani et al., "A Context-Aware Authentication Framework for Smart Homes", 2017 IEEE 30th Canadian Conference on Electrical and Computer Engineering (CCECE), 5 pages.

(Continued)

*Primary Examiner* — Richard A McCoy
(74) *Attorney, Agent, or Firm* — Stosch Sabo

(57) ABSTRACT

Described are techniques for collaboration-based authentication including a method comprising storing a user profile comprising information related to a user account, a plurality of user devices, and a user calendar. The method further comprises detecting an authentication attempt associated with the user account and retrieving device information associated with a first device initiating the authentication attempt, a first location of the first device, a second location of a second device of the plurality of user devices, and a scheduled location based on the user calendar. The method further comprises determining that the authentication attempt comprises a security risk based on the device information associated with the first device, the first location of the first device, the second location of the second device, and the scheduled location. The method further comprises performing a mitigation action in response to determining that the authentication attempt comprises the security risk.

20 Claims, 8 Drawing Sheets

(58) Field of Classification Search
CPC ........... H04L 63/1425; H04L 63/1441; H04W 12/61; H04W 12/63; H04W 12/64
See application file for complete search history.

(56) References Cited

U.S. PATENT DOCUMENTS

| | | | |
|---|---|---|---|
| 8,295,898 B2 | 10/2012 | Ashfield et al. | |
| 8,401,906 B2 | 3/2013 | Ruckart | |
| 8,977,746 B2 | 3/2015 | Hughes et al. | |
| 9,355,231 B2* | 5/2016 | Disraeli | H04W 4/02 |
| 9,911,260 B2* | 3/2018 | DeLuca | G07C 9/28 |
| 10,069,829 B1* | 9/2018 | Arunkumar | H04L 9/14 |
| 2010/0175116 A1* | 7/2010 | Gum | G06F 21/316 726/6 |
| 2010/0218249 A1* | 8/2010 | Wilson | H04L 9/3226 726/19 |
| 2013/0254401 A1* | 9/2013 | Marshall | G06F 21/6218 709/226 |
| 2014/0105449 A1 | 4/2014 | Caton et al. | |
| 2015/0089585 A1* | 3/2015 | Novack | H04L 63/1433 726/3 |
| 2015/0310434 A1* | 10/2015 | Cheung | H04W 12/06 705/44 |
| 2015/0339477 A1* | 11/2015 | Abrams | G06F 21/554 726/23 |
| 2016/0188902 A1* | 6/2016 | Jin | H04W 4/029 726/28 |
| 2017/0195318 A1 | 7/2017 | Liu et al. | |
| 2018/0183779 A1* | 6/2018 | Krishan | H04W 12/06 |
| 2018/0191695 A1* | 7/2018 | Lindemann | H04L 63/0853 |
| 2019/0014097 A1 | 1/2019 | Hwang et al. | |
| 2019/0036925 A1* | 1/2019 | Isola | H04L 63/101 |
| 2019/0087561 A1* | 3/2019 | Kumar | H04L 63/107 |
| 2019/0102533 A1* | 4/2019 | Sagar | G06F 21/34 |
| 2019/0312941 A1* | 10/2019 | Maccini | G06F 21/602 |
| 2020/0404488 A1* | 12/2020 | Dolan | H04W 12/08 |
| 2021/0014234 A1* | 1/2021 | Kwatra | H04W 76/38 |

FOREIGN PATENT DOCUMENTS

| | | |
|---|---|---|
| CN | 105959317 A | 9/2016 |
| CN | 107438004 A | 12/2017 |
| KR | 1020060070309 A | 6/2006 |

OTHER PUBLICATIONS

Ashibani et al., "Design and Implementation of a Contextual-Based Continuous Authentication Framework for Smart Homes", Appl. Syst. Innov. 2019, 20 pages.

Mell et al., "The NIST Definition of Cloud Computing", Recommendations of the National Institute of Standards and Technology, Sep. 2011, 7 pages.

Notification of Transmittal of the International Search Report and the Written Opinion of the International Searching Authority, or the Declaration, dated Feb. 9, 2021, International Application No. PCT/IB2020/060090, 9 pages.

* cited by examiner

AUTHENTICATION MECHANISM UTILIZING LOCATION CORROBORATION

BACKGROUND

The present disclosure relates to authentication mechanisms, and, more specifically, to an authentication mechanism utilizing location corroboration.

Authentication mechanisms are one strategy for increasing security in networked environments. Authentication mechanisms come in many forms, including, for example, alphanumeric passwords, biometric passwords, multi-factor authentication (MFA), hard tokens, soft tokens, and the like. Authentication mechanisms can be useful for reducing fraudulent activity based on identity theft and/or impersonation.

SUMMARY

Aspects of the present disclosure are directed toward a method comprising storing a user profile comprising information related to a user account, a plurality of user devices, and a user calendar. The method further comprises detecting an authentication attempt associated with the user account. The method further comprises retrieving device information associated with a first device initiating the authentication attempt, a first location of the first device initiating the authentication attempt, a second location of a second device of the plurality of user devices, and a scheduled location based on the user calendar. The method further comprises determining that the authentication attempt comprises a security risk based on the device information associated with the first device, the first location of the first device, the second location of the second device, and the scheduled location. The method further comprises performing a mitigation action in response to determining that the authentication attempt comprises the security risk.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
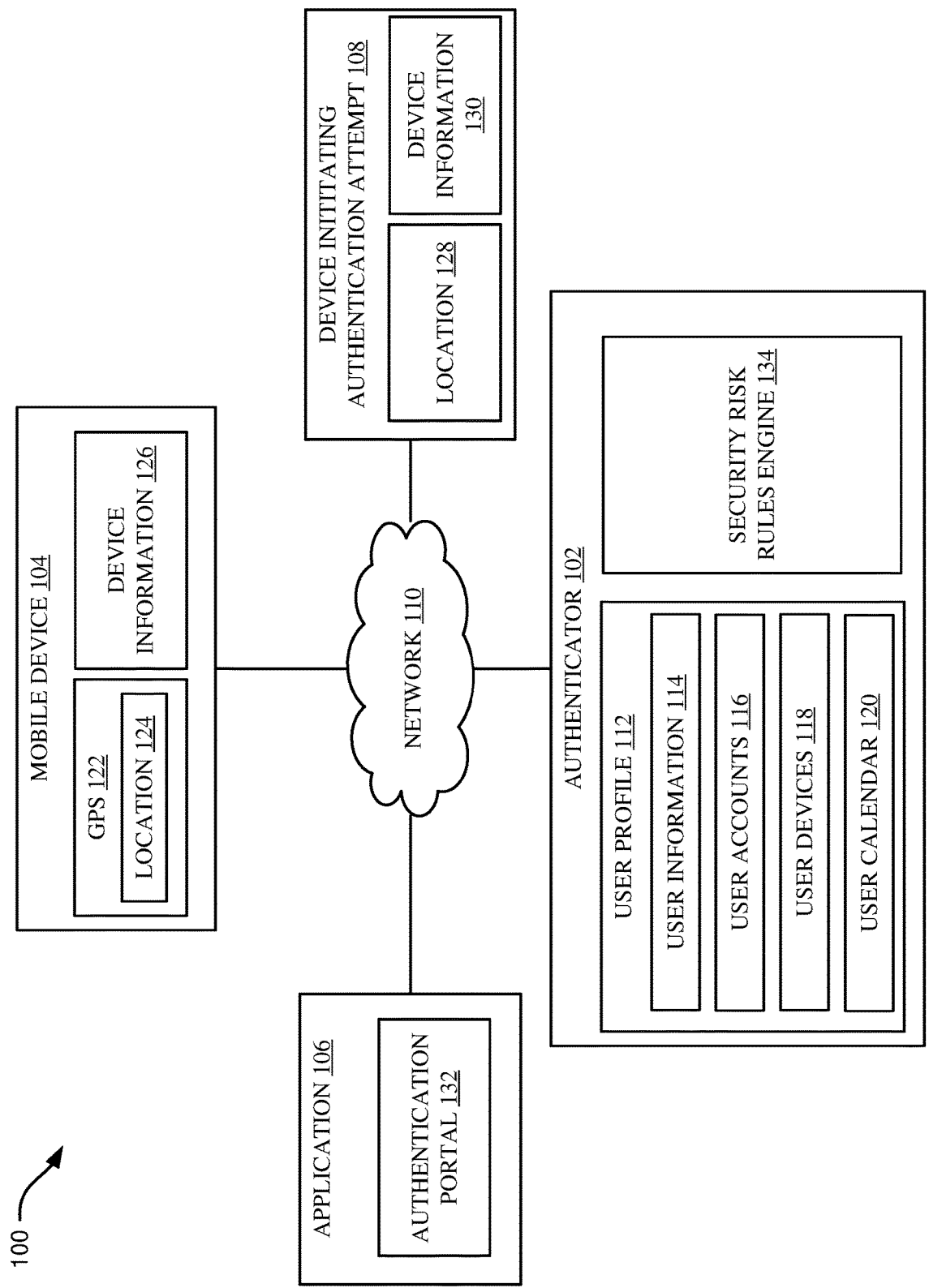
FIG. 1 illustrates a block diagram of an example authentication environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward authentication mechanisms, and, more specifically, to an authentication mechanism utilizing location corroboration. While not limited to such applications, embodiments of the present disclosure may be better understood in light of the aforementioned context.

Aspects of the present disclosure are directed toward an authenticator configured to add an additional layer of security to a user's web-based accounts, applications, and/or profiles. The authenticator utilizes one or more of (1) locations of devices owned by the user and/or (2) scheduled locations inferred from an electronic calendar associated with the user in order to corroborate (e.g., validate, verify, confirm, substantiate, certify, endorse, etc.) a location of a device initiating an authentication attempt to one of the user's accounts with a location of the user. Corroborating a location of a device initiating an authentication attempt with a location of a device owned by the user and/or a scheduled location inferred from an electronic calendar can be beneficial for reducing unauthorized account access.

For example, a user may attempt to login to a banking portal from a public computer. The authenticator can be configured to detect that a smartphone associated with the user is at a similar location as the public computer, and thereby indirectly verify that the user is the individual attempting the login from the public computer. Any number of user devices may be used such as smartphones, smartwatches, wearable devices, health monitoring devices, vehicles, tablets, laptops, and the like to verify a user's location and corroborate the user's location with a location of an attempted login.

However, in some situations, user devices may be unavailable when a user accesses a user account from an unknown device. In such situations, the authenticator can be further configured to detect a scheduled location from a calendar associated with the user and compare the scheduled location to the location of the unknown device initiating the authentication attempt. In this example, if a user attempts to login to the banking portal from an unknown device (e.g., a hotel computer) in a certain city, the authenticator can detect that the user is scheduled to be in the certain city by analyzing data in the electronic calendar associated with the user. In this way, the authenticator can corroborate a user's location with a location of an unknown device initiating an authentication attempt in situations where the user does not have any user devices available to corroborate the location.

Furthermore, aspects of the present disclosure can perform mitigation actions in situations where no user devices are in a vicinity of a location of an authentication attempt and where an electronic calendar does not indicate that the user is in the location of the authentication attempt. In such situations, the mitigation actions can include sending a notification, locking a device, restricting access to an account, and the like.

Thus, aspects of the present disclosure are directed to improved cybersecurity for user accounts, applications, and/or profiles. The improved cybersecurity reduces unauthorized account access by utilizing a user's devices and/or electronic calendar to corroborate a location of a user with a location of an attempted login. In cases where the user's location can be corroborated with the location of the attempted login, the authenticator can determine that there is no security risk. In cases where the user's location cannot be corroborated with the location of the attempted login, the authenticator can determine that there is a security risk and can implement a mitigation action such as, but not limited to, issuing a notification, locking a device, restricting access to an account, and the like.

FIG. 1 illustrates an example authentication environment 100, in accordance with some embodiments of the present disclosure. Authentication environment 100 includes an authenticator 102, a mobile device 104, an application 106, and a device initiating an authentication attempt 108 that are permanently or intermittently communicatively coupled to one another (directly or indirectly) via one or more similar or dissimilar networks, generally illustrated here as network 110 for simplicity.

Authenticator 102 can include a user profile 112 and a security risk rules engine 134. The user profile 112 can represent a profile voluntarily created by a user in order to enable the authenticator 102 to provision cybersecurity monitoring services to the user. The user profile 112 can include user information 114, user accounts 116, user devices 118, and user calendar 120. User information 114 can include, for example, a name, a birth date, a unique identifier (e.g., a driver's license number, a social security number, a passport number, an employee serial number, etc.), a physical address, an email address, billing information, and/or other information.

User accounts 116 can include, for example, a listing of applications, services, and/or businesses that the user can interact with via online portals, applications, and/or interfaces. Each of the user accounts 116 can include identification information and/or authentication information such as, for example, one or more of: an application identifier, a user sign-in, a user password, and the like. The user accounts 116 can include, for example, banking accounts, financial accounts, payment processing accounts, health accounts, retail accounts, and the like.

User devices 118 can list devices associated with the user profile 102. For example, if mobile device 104 belongs to the user of user profile 112, then information about mobile device 104 can be stored in user devices 118. User devices 118 can store information such as, but not limited to, a device name, a device model, a device serial number, a device Media Access Control (MAC) address, a device International Mobile Equipment Identity (IMEI) number, and/or device configuration information.

User calendar 120 can refer to one or more electronically stored calendars, agendas, and/or itineraries that are associated with a user owning user profile 112. User calendar 120 can be accessed through another service such as, for example, an email service that includes calendar functionality. User calendar 120 can include appointments, reminders, flight information, hotel information, meeting information, and so on. User calendar 120 can include direct or indirect information related to locations of various appointments, reminders, meetings, vacations, and/or plans. In some embodiments, a user calendar 120 is generated by authenticator 102 by accessing a corpus of user information such as, but not limited to, emails, text messages, voicemails, calendar appointments, driving history, and the like.

Mobile device 104 can be, for example, a smartphone, a tablet, a laptop, a smartwatch, a wearable device, or the like. Mobile device 104 can include a GPS 122 identifying a location 124 associated with the mobile device 104. Although GPS 122 is shown in mobile device 104, in some embodiments, the GPS 122 is located in a device communicatively coupled to the mobile device 104. For example, a smartwatch may not include a GPS 122, however, the smartwatch may be communicatively coupled to a smartphone via a personal area network (PAN) and the smartphone can contain the GPS 122 that provides approximate location information to the smartwatch. Furthermore, mobile device 104 may not include a GPS 122, but may have other mechanisms for determining location 124 such as, for example, triangulating the location 124 from multiple network access points in the vicinity of the mobile device 104. Mobile device 104 can further include device information 126. Device information 126 can include, but is not limited to, a device name, a device model, a device serial number, a device MAC address, a device IMEI number, device configuration information, and/or other device information.

Although a single mobile device 104 is shown, this is for representative purposes only. In some embodiments, a plurality of mobile devices 104 can be associated with user profile 112 and itemized in user devices 118. This plurality of mobile devices 104 can include smartphones, smartwatches, laptops, desktops, tablets, vehicles, headphones, smartglasses, wearable devices, and/or other devices associated with the user profile 112 and itemized in user devices 118. In other words, the plurality of mobile devices 104 itemized in user devices 118 can collectively interact in an Internet of Things (IoT) environment useful for reducing unauthorized access to, or fraudulent activity within, user accounts 116 by corroborating a user's location with a location 128 of a device initiating an authentication attempt 108.

Application 106 can refer to any application that may benefit from additional security provided by authenticator 102, such as, for example, a financial services application, a banking application, a health application, a retail application, a payment processing application, or any other application that can include sensitive or personal information. In some embodiments, application 106 includes an authentication portal 132 for receiving authentication information during an attempted login such as, for example, login credentials (e.g., an identifier and a password). Authenticator 102 can interact with application 106 as an additional security mechanism for reducing cybersecurity risks such as unauthorized account access and/or fraudulent account activity. Authenticator 102 can identify application 106 as an application that is utilized by the user profile 112 based on the information stored in user accounts 116.

The device initiating the authentication attempt 108 can refer to any device that is used to attempt to access one of user accounts 116 (e.g., via the authentication portal 132 in application 106). In some embodiments, the device initiating the authentication attempt 108 is associated with the user profile 112 and is included in the user devices 118, whereas in other embodiments the device initiating the authentication attempt 108 is not associated with the user profile 112 and is not listed as one of the devices in user devices 118. In situations where the device initiating the authentication attempt 108 is not one of the user devices 118, the device initiating the authentication attempt 108 can nonetheless represent a legitimate login attempt to the application 106 by the user associated with the user profile 112 in instances where the device initiating the authentication attempt 108 is, for example, a public device, a friend's device, a family member's device, a rented device, a new device, and the like.

The device initiating the authentication attempt 108 can include a location 128 and device information 130. Location 128 can be directly retrieved from a GPS (not shown) associated with the device initiating the authentication attempt 108 or indirectly determined based on, for example, an Internet Protocol (IP) address associated with the device initiating the authentication attempt 108 or other location identification mechanisms. Device information 130 can include one or more of a device name, a device model, a device serial number, a device MAC address, a device IMEI number, and/or device configuration information.

Referring back to the security risk rules engine 134 of the authenticator 102, the security risk rules engine 134 can be configured to retrieve information related to the device initiating the authentication attempt 108 and compare it against information associated with user profile 112 to determine whether or not the authentication attempt constitutes a security risk. Security risk rules engine 134 can determine whether or not the attempted login constitutes a security risk by determining if a location 128 of the device initiating the authentication attempt 108 can be corroborated with the user's location as inferred from one or both of a location 124 of a mobile device 104 associated with the user profile 112 (e.g., stored in user devices 118) and/or a scheduled location inferred from the user calendar 120. In some embodiments, the security risk rules engine 134 utilizes an aggregate score (discussed hereinafter with respect to FIGS. 2A and 3), whereas in other embodiments the security risk rules engine 134 utilizes a decision tree (discussed hereinafter with respect to FIGS. 2B and 4).

Figure 2A:
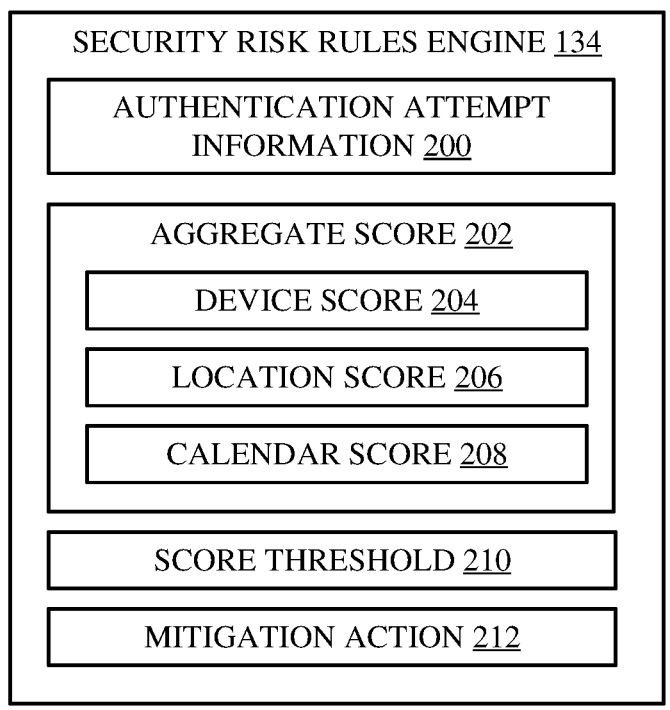
FIG. 2A illustrates a block diagram of an example security risk rules engine configured to identify security risks based on an aggregate score, in accordance with some embodiments of the present disclosure.

FIG. 2A illustrates an example security risk rules engine 134 utilizing an aggregate score 202, in accordance with some embodiments of the present disclosure. The security risk rules engine 134 illustrated in FIG. 2A contains authentication attempt information 200. The authentication attempt information 200 can include, for example, a location 128 of the device initiating the authentication attempt 108, device information 130 of the device initiating the authentication attempt 108, respective device information for respective devices listed in user devices 118 (e.g., device information 126 of mobile device 104), respective locations of respective devices listed in user devices 118 (e.g., location 124 of mobile device 104), a time of the authentication attempt, a scheduled location retrieved from user calendar 120, and/or other information related to the authentication attempt.

The authentication attempt information 200 can be used to generate an aggregate score 202. The aggregate score 202 can be used to determine whether or not the authentication attempt information 200 constitutes a security risk. The aggregate score 202 can be made up of one or more sub-scores such as a device score 204, a location score 206, and/or a calendar score 208.

The device score 204 can indicate whether the device information 130 of the device initiating the authentication attempt 108 matches any device information stored in user devices 118 of the user profile 112. The device score 204 can be based on general information (e.g., a device type, a device model, a device configuration, etc.) and/or specific information (e.g., a device MAC address, a device IMEI number, etc.). The device score 204 can be a binary score or a variable score. When the device score 204 is a binary score, the device score 204 can be generated based on a comparison between the device information 130 and device information of any one of the devices listed in user devices 118. The device score 204 can be, for example, 1 (or any other value indicating TRUE) for a match between the device information 130 of the device initiating the authentication attempt 108 to one of the devices stored in user devices 118 or 0 (or any other value indicating FALSE) for no match between the device information 130 of the device initiating the authentication attempt 108 and any of the devices stored in user devices 118. When the device score 204 is a variable score, the device score 204 can be generated based on a similarity between the device information 130 and device information of any one of the devices listed in user devices 118. The similarity can be, for example, a quantification of a degree of likeness between two similar portions of device information (e.g., the device score 204 can be an inverse of a number of syntactic differences between two MAC addresses, etc.). In this example, a higher degree of similarity can be associated with a higher device score 204, whereas a lower degree of similarity can be associated with a lower device score 204.

A location score 206 can indicate whether the location 128 of the device initiating the authentication attempt 108 is similar to a second location of a device stored in user devices 118 (e.g., location 124 of mobile device 104). The location score 206 can be binary or variable. When the location score 206 is variable, the location score 206 can be a function of (1) the proximity of a closest device in user devices 118 to the location 128 of the device initiating the authentication attempt 108 and/or (2) the proximity of multiple devices in user devices 118 to the location 128 of the device initiating the authentication attempt 108. As an example, two devices from user devices 118 in close proximity to the device initiating the authentication attempt 108 can be associated with a higher score than a single device from user devices 118 in close proximity to the device initiating the authentication attempt 108. As another example, a device from user devices 118 within a certain distance (e.g., 10 meters (32.8 feet)) of the device initiating the authentication attempt 108 can be associated with a higher score than a device from user devices 118 within a larger distance (e.g., 100 meters (328 feet)) of the device initiating the authentication attempt 108. When the location score 206 is binary, the location score 206 can be based on whether or not any predetermined number of devices in user devices 118 (e.g., one, two, three, etc.) are within a threshold distance of the location 128 of the device initiating the authentication attempt 108. The threshold distance can be configurable, such as any distance less than or equal to 15.24 meters (50 feet), any distance less than or equal to 61 meters (200 feet), or a different threshold distance.

A calendar score 208 can indicate whether the location 128 of the device initiating the authentication attempt 108 is similar to a scheduled location retrieved from (or inferred from) the user calendar 120. The calendar score 208 can be variable or binary. When the calendar score 208 is variable, the calendar score 208 can be a function of the nearness of the location 128 of the device initiating the authentication attempt 108 to the scheduled location, where a shorter distance between the location 128 and the scheduled location can be associated with a higher score and where a larger distance between the location 128 and the scheduled location can be associated with a lower score. In contrast, when the calendar score 208 is binary, the calendar score 208 can be a determined by comparing a distance between the location 128 of the device initiating the authentication attempt 108 and the scheduled location with a threshold distance, where the threshold distance can be a similar or different threshold distance than the threshold distance discussed above with respect to the location score 206. In some embodiments, the threshold distance associated with the calendar score 208 is higher than the threshold distance associated with the location score 206 insofar as a scheduled location inferred from the user calendar 120 may have less specificity than the location 128 of the device initiating the authentication attempt 108 and/or the location 124 of the mobile device 104. For example, the scheduled location may specify a city, whereas the location 124 and/or the location 128 may be associated with a specific address within a specific city. For these reasons, a threshold distance associated with the calendar score 208 can be configured to be greater than a threshold distance associated with the location score 206.

One or more of the device score 204, location score 206, and/or calendar score 208 can be used to generate the aggregate score 202. Any number of algorithms can be utilized to combine one or more of the device score 204, location score 206, and/or calendar score 208 into the aggregate score 202. In some embodiments, the individual terms are weighted similarly or differently. In some embodiments, the aggregate score 202 is associated with a confidence, a probability, or a different qualifier of the accuracy or certainty of the aggregate score 202.

The aggregate score 202 can be compared to a score threshold 210. If the aggregate score 202 is less than the score threshold 210, the aggregate score 202 can indicate a security risk, whereas if the aggregate score 202 is greater than the score threshold 210, the aggregate score 202 can indicate no security risk (or vice versa).

If the aggregate score 202 compared to the score threshold 210 indicates a security risk, the security risk rules engine 134 can generate a mitigation action 212. Mitigation action 212 can include, for example, sending a notification to an account associated with the user profile 112. The notification can be in the form of an email, a text message, a phone call, or the like. The notification can include information related to the security risk such as, for example, an identification of an account in user accounts 116 that experienced an attempted authentication, device information 130 of the device initiating the authentication attempt 108, a location 128 of the device initiating the authentication attempt 108, a time of the authentication attempt, and/or other information. The mitigation action 212 can alternatively comprise (or additionally comprise) one or more of a device lock, an account lock, or another mitigation action that prevents a potentially malicious user from utilizing a compromised device or accessing a compromised account. A device lock can include powering down, locking, logging out, or another mechanism useful for preventing malicious use of the device initiating the authentication attempt 108. An account lock can include restricting access to the account associated with the attempted authentication, where the restricted access can require additional verification to restore access to the account such as, but not limited to, providing answers to security questions, performing multi-factor authentication, suspending the account for a predetermined period of time, and the like.

Figure 2B:
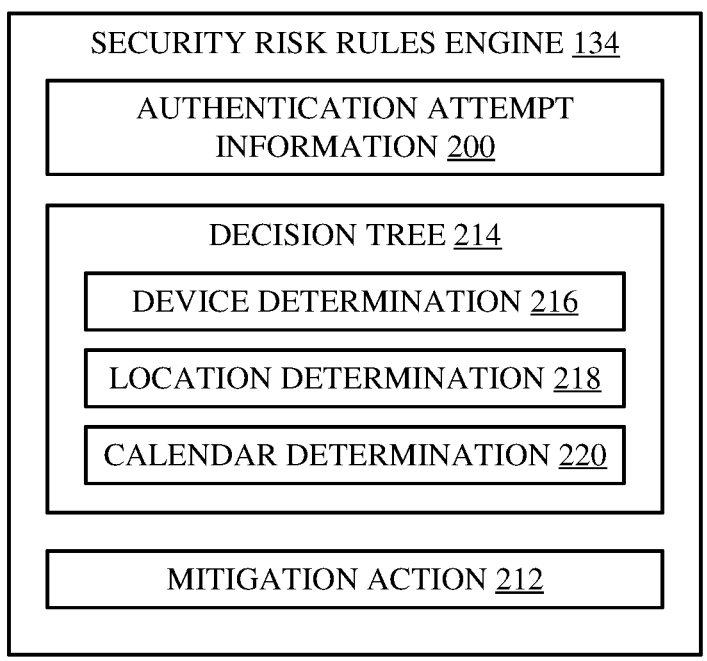
FIG. 2B illustrates a block diagram of an example security risk rules engine configured to identify security risks based on a decision tree, in accordance with some embodiments of the present disclosure.

FIG. 2B illustrates an example security risk rules engine 134 utilizing a decision tree 214, in accordance with some embodiments of the present disclosure. The security risk rules engine 134 can contain similar features as those previously discussed with respect to FIG. 2A, namely, authentication attempt information 200 and mitigation action 212. In contrast to FIG. 2A, FIG. 2B includes decision tree 214. Decision tree 214 can be made up of one or more binary determinations such as device determination 216, location determination 218, and/or calendar determination 220. Device determination 216 can include determining whether or not the device initiating the authentication attempt 108 matches device information of a device listed in user devices 118 (e.g., device information 126 of mobile device 104). Location determination 218 can include determining whether or not a location 128 of the device initiating the authentication attempt 108 is sufficiently near to a predetermined number of devices (e.g., one, two, three, etc.) listed in user devices 118. Calendar determination 220 can include determining whether or not the location 128 of the device initiating the authentication attempt 108 is sufficiently near a scheduled location retrieved from user calendar 120. Location determination 218 and calendar determination 220 can utilize a same or different distance threshold for comparing the location 128 of the device initiating the authentication attempt 108 to respective locations of respective devices listed in user devices 118 (e.g., location 124 of mobile device 104), or for comparing the location 128 of the device initiating the authentication attempt 108 to the scheduled location determined from user calendar 120.

In some embodiments, a NO or FALSE determination associated with one or more of, two or more of, or each of the device determination 216, the location determination 218, and/or the calendar determination 220 can indicate a security risk. In response to detecting a security risk, the security risk rules engine 134 can generate and execute a mitigation action 212.

Figure 3:
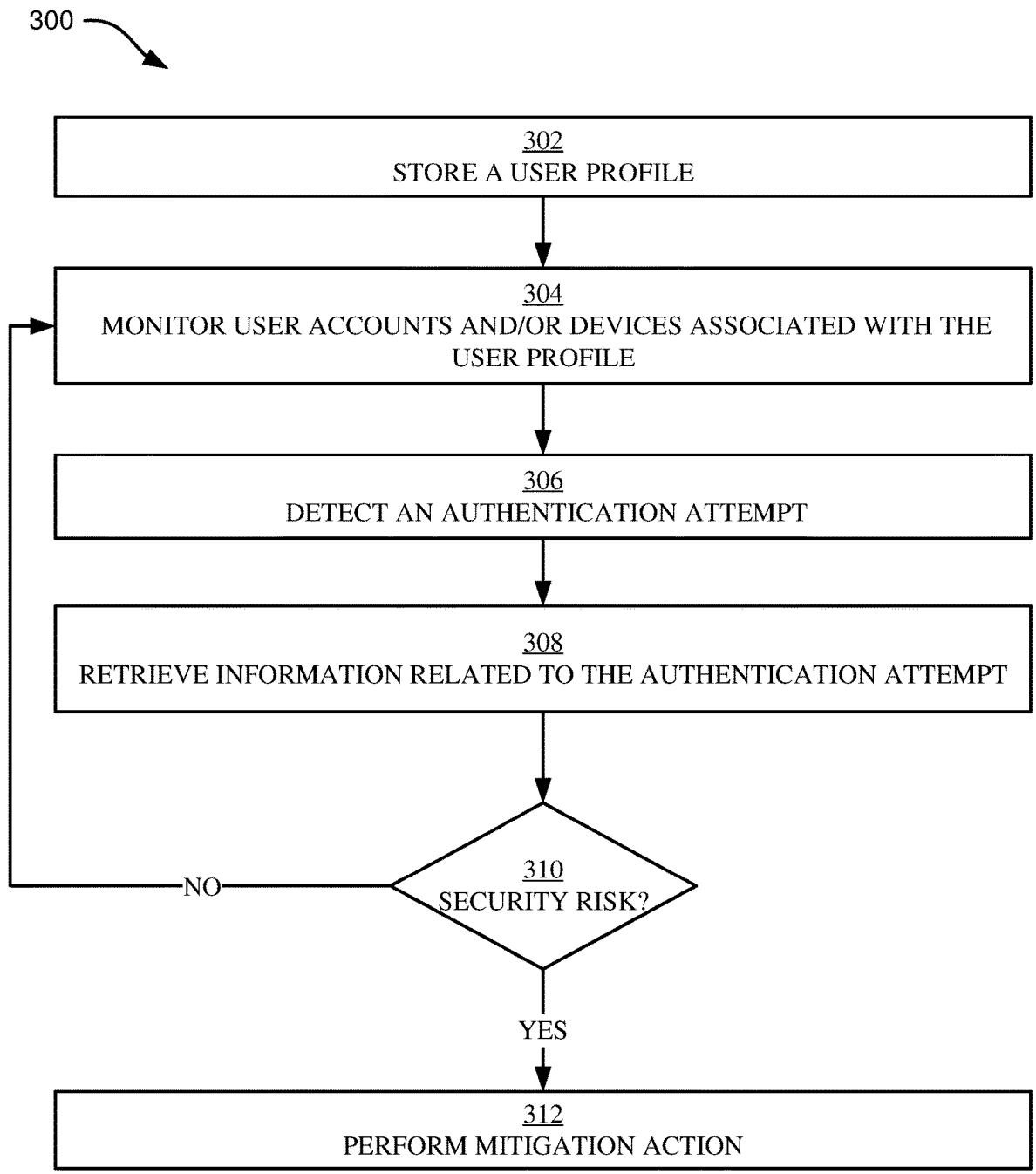
FIG. 3 illustrates a flowchart of an example method for utilizing authentication environment based on location corroboration, in accordance with some embodiments of the present disclosure.

FIG. 3 illustrates a flowchart of an example method 300 for utilizing an authentication environment 100, in accordance with some embodiments of the present disclosure. The method 300 can be performed by an authenticator 102 or a different configuration of hardware and/or software.

Operation 302 includes storing a user profile 112. The user profile 112 can include one or more of user information 114, user accounts 116, user devices 118, and/or user calendar 120. The user profile 112 can be created based on user input to the authenticator 102, such as a user signing up for security services provisioned by authenticator 102. As a part of creating and storing the user profile 112, the user can agree to various terms and conditions including information related to what personal data is collected, how any collected personal data is used, and a protocol for deleting any collected personal data should the user profile 112 be deleted, deactivated, or otherwise terminated.

Operation 302 can further include associating user devices 118 with the user profile 112. For example, if mobile device 104 is associated with the user profile 112, information about mobile device 104 can be stored in user devices 118. User devices 118 can store, for each device associated with user profile 112, one or more of a device name, a device model, a device serial number, a device MAC address, a device IMEI number, device configuration information, and/or other device information.

Operation 302 can further include associating a user calendar 120 with the user profile 112. Access to the user calendar 120 can be provided by the user to the authenticator 102 so that the authenticator 102 can access, retrieve, and/or store the user calendar 120 as needed. In some embodiments, multiple user calendars 120 are associated with the user profile 112.

Operation 304 includes monitoring user activity. In some embodiments, monitoring user activity includes monitoring each of the user accounts 116. In some embodiments, operation 304 comprises waiting to receive an indication of an authentication attempt to any one of user accounts 116.

Operation 306 includes detecting an indication of an authentication attempt to one of the user accounts 116 associated with an application 106. In some embodiments, the application 106 notifies the authenticator 102 of the authentication attempt. In some embodiments, the authenticator 102 detects the authentication attempt based on monitoring user accounts 116 in operation 304.

In response to detecting an authentication attempt, operation 308 includes retrieving information related to the authentication attempt from the application 106 and/or one or more user devices from the list of user devices 118 (e.g., authentication attempt information 200). The retrieved information can include, for example, one or more of (1) device information 130 related to the device initiating the authentication attempt 108, (2) device information associated with each of the user devices 118, (3) a location 128 of the device initiating the authentication attempt 108, (4) a time of the authentication attempt, (5) a location associated with each of the devices in user devices 118, and/or (6) a scheduled location retrieved from user calendar 120.

Operation 310 includes determining if the authentication attempt constitutes a security risk. The following illustrate several examples that may not constitute a security risk: (1) device information 130 related to the device initiating the authentication attempt 108 matches device information for one of the devices stored in user devices 118 (e.g., device information 126 matches device information 130), (2) a location 128 of the device initiating the authentication attempt 108 matches a location of at least one of the devices in the user devices 118 (e.g., location 124 matches location 128), and/or (3) a location 128 of the device initiating the authentication attempt 108 matches a scheduled location associated with user calendar 120 for the time of the authentication attempt. In contrast, the following illustrates an example that may constitute a security risk: (1) the location 128 of the device initiating the authentication attempt 108 does not match a location of any device in user devices 118, and the location 128 of the device initiating the authentication attempt 108 does not match a scheduled location associated with the user calendar 120 for the time of the authorization attempt.

If there is no security risk (310: NO), the method 300 returns to operation 304 and continues monitoring the user accounts 116. If there is a security risk (310: YES), the method 300 proceeds to operation 312. Operation 312 includes performing a mitigation action 212.

Figure 4:
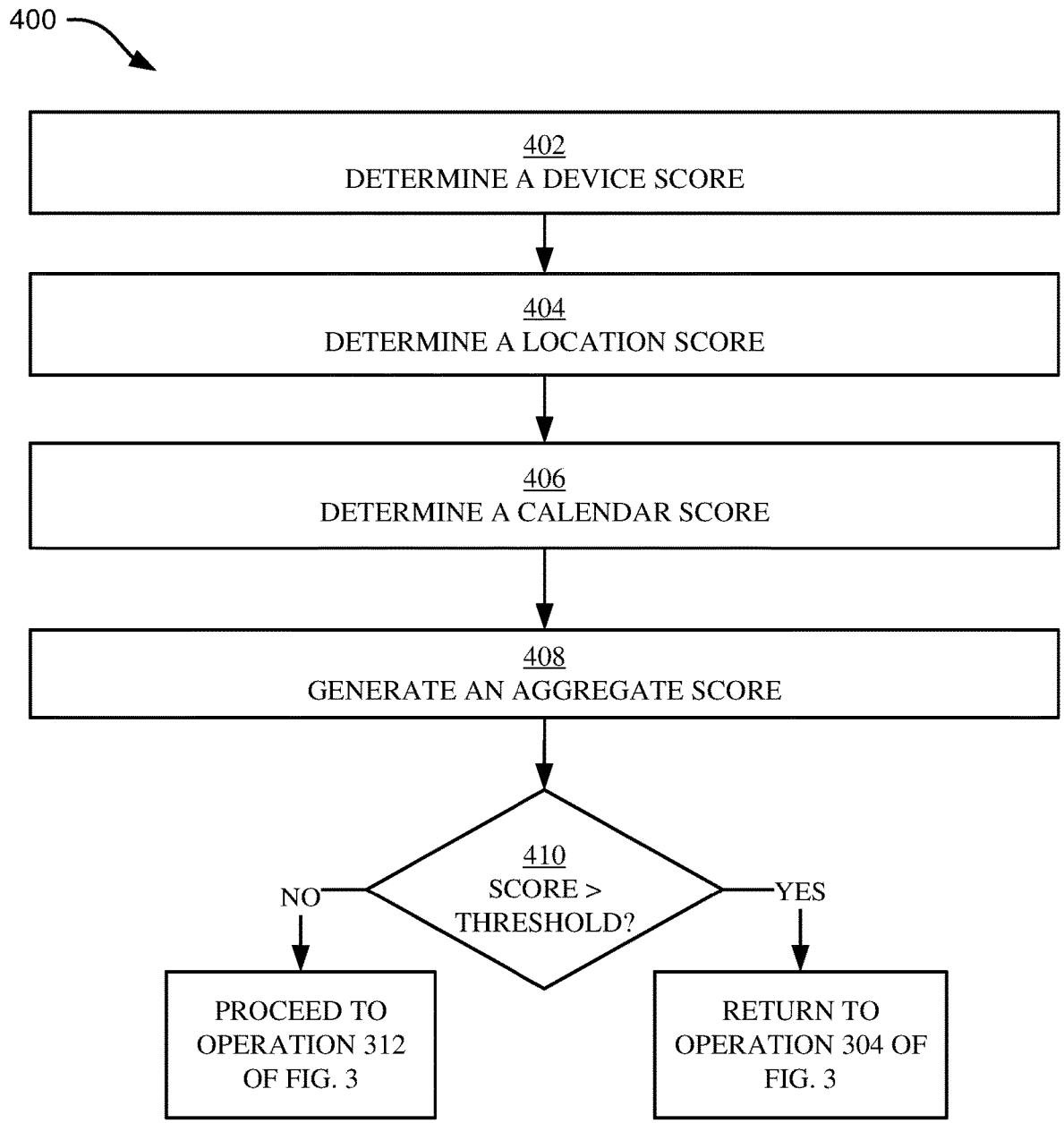
FIG. 4 illustrates a flowchart of an example method for detecting security risks in an authentication environment using an aggregate score, in accordance with some embodiments of the present disclosure.

FIG. 4 illustrates a flowchart of an example method 400 for managing security based on an aggregate score 202 generated in an authentication environment 100, in accordance with some embodiments of the present disclosure. The method 400 can represent a more detailed method of operation 310 of FIG. 3. The method 400 can be performed by an authenticator 102 or a different configuration of hardware and/or software. Advantageously, the method 400 utilizing the aggregate score 202 can be useful as a precise, accurate, granular or otherwise customized assessment of the security risks associated with various authentication attempts.

Operation 402 includes determining a device score 204. The device score 204 can be based on determining similarities and differences between device information 130 of a device initiating an authentication attempt 108 and device information associated with one or more of the devices included in user devices 118 (e.g., device information 126 of mobile device 104). The similarities and differences can be based on a comparison between device names, device models, device configurations, device MAC addresses, device IMEI numbers, and/or different device information.

Operation 404 includes determining a location score 206. The location score 206 can be based on a comparison of the location 128 of the device initiating the authentication attempt 108 with respective locations of one or more user devices listed in user devices 118 (e.g., location 124 of mobile device 104). In some embodiments, operation 404 includes determining a distance between the location 128 of the device initiating the authentication attempt 108 and a nearest device of the user devices 118. In some embodiments, operation 404 includes determining a respective distance between the location 128 of the device initiating the authentication attempt 108 and two or more (or each of) the respective locations of devices in user devices 118. The locations (e.g., location 124, location 128) can be based on, for example, GPS information, an IP addresses, and/or different information that can directly or indirectly indicate a specific or general location.

Operation 406 includes determining a calendar score 208. The calendar score 208 can be based on a comparison of the location 128 of the device initiating the authentication attempt 108 with a scheduled location based on the user calendar 120. Operation 406 can include performing natural language processing, machine learning, deep learning, or other functions on the user calendar 120 in order to derive inferences, insights, and/or predictions from the user calendar 120 related to a scheduled location. In some embodiments, a distance is calculated between the location 128 of the device initiating the authentication attempt 108 and the scheduled location.

Operation 408 includes generating an aggregate score 202. The aggregate score 202 can be based on one or more of the device score 204, the location score 206, and/or the calendar score 208, each of which can be similarly or differently weighted, according to various embodiments. The aggregate score 202 can represent a degree of corroboration between a user's inferred location (e.g., based on locations of the user's devices and/or a user's scheduled locations based on a user's calendar) and a location 128 of the device initiating the authentication attempt 108.

Operation 410 includes comparing the aggregate score 202 to the score threshold 210. If the aggregate score 202 is less than the score threshold 210 (410: NO), the authenticator 102 can determine that there is a security risk and the method 400 can proceed to operation 312 of FIG. 3 and perform a mitigation action 212. If the aggregate score 202 is greater than the score threshold 210 (410: YES), the authenticator 102 can determine that there is no security risk and the method 400 can return to operation 304 of FIG. 3.

Figure 5:
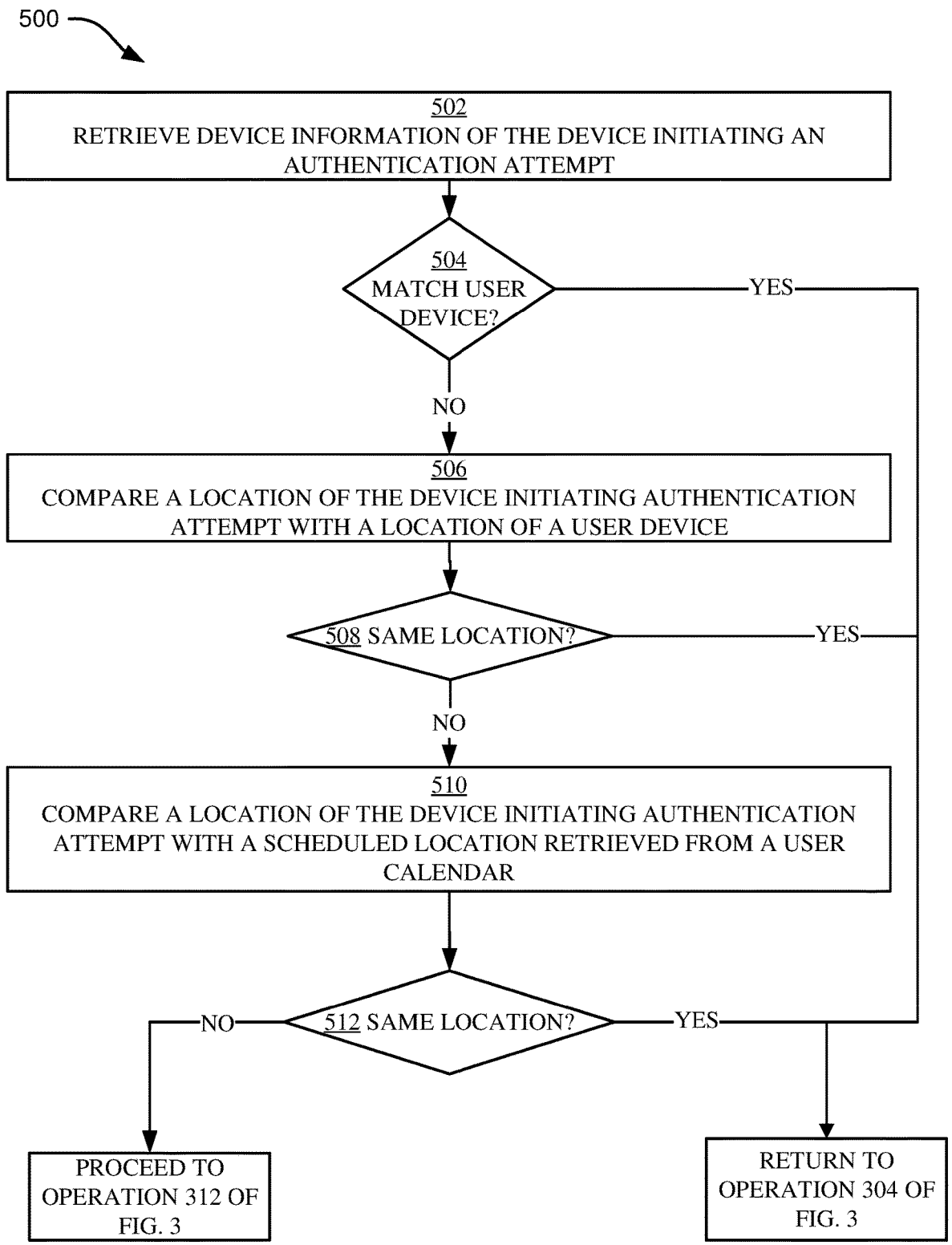
FIG. 5 illustrates a flowchart of an example method for detecting security risks in an authentication environment using a decision tree, in accordance with some embodiments of the present disclosure

FIG. 5 illustrates a flowchart of an example method 500 for managing security in an authentication environment 100 using a decision tree 214, in accordance with some embodiments of the present disclosure. The method 500 can be a sub-method of operations 308 and 310 of FIG. 3. The method 500 can be implemented by an authenticator 102 or a different configuration of hardware and/or software. Advantageously, the decision tree 214 utilized by the method 500 can be useful as an efficient mechanism for determining whether or not an attempted login constitutes a security risk.

Operation 502 includes retrieving device information 130 associated with the device initiating the authentication attempt 108. Device information can include, but is not limited to, a device name, a device model, a device configuration, a device MAC address, a device IMEI number, and/or different device information.

Operation 504 includes determining if the device information 130 associated with the device initiating the authentication attempt 108 matches device information of a device stored in user devices 118 (e.g., device determination 216). For example, operation 504 can include comparing a MAC address or IMEI number of the device initiating the authentication attempt 108 with MAC addresses or IMEI numbers stored in user devices 118. If there is a match (404: YES), the method 500 can return to operation 304 of FIG. 3. If there is not a match (404: NO), the method 500 can proceed to operation 506.

Operation 506 includes comparing a location 128 of the device initiating the authentication attempt 108 with respective locations of devices in user devices 118. Operation 506 can collect this information based on GPS information, IP address information, and/or other information that is useful for directly indicating or indirectly inferring locations of devices.

Operation 508 includes determining if the location 128 of the device initiating the authentication attempt 108 is corroborated by a location of any of the devices in user devices 118 (e.g., location determination 218). If so, (408: YES), the method 500 can return to operation 304 of FIG. 3. If not (408: NO), the method 500 can proceed to operation 510.

Operation 510 includes comparing a location 128 of the device initiating the authentication attempt 108 with a scheduled location retrieved from (or inferred from) the user calendar 120. Operation 512 includes determining if the location 128 of the device initiating the authentication attempt 108 is corroborated by a scheduled location retrieved from (or inferred from) the user calendar 120 (e.g., calendar determination 220). If so (512: YES), the method 500 returns to operation 304 of FIG. 3. If not (512: NO), the method 500 proceeds to operation 312 of FIG. 3 and performs a mitigation action 212.

Although FIG. 5 illustrates the determinations in a certain order (e.g., device determination 216, location determination 218, calendar determination 220), this order is shown purely for illustrative purposes. In other embodiments, different orders can occur. Likewise, in some embodiments, more or fewer determinations (e.g., any one or any two of the aforementioned determinations) can be used to determine whether or not an attempted login constitutes a security risk.

Figure 6:
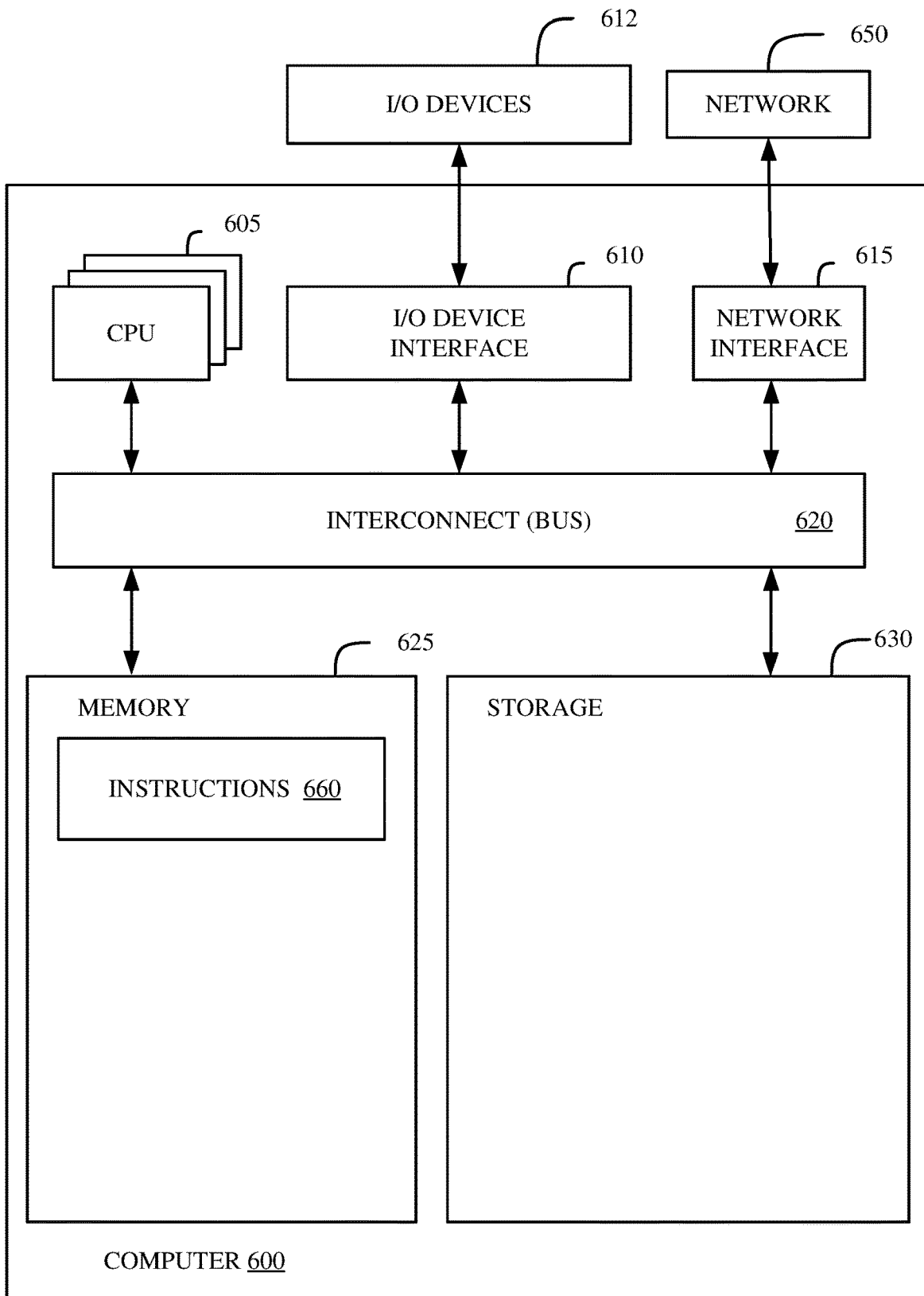
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform the methods described in any one or more of FIGS. 3-5 and/or implement the functionality discussed in any one of FIGS. 1 and 2A-2B. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine such that the client machine executes the method, or a portion of the method, based on the instructions provided by computer 600. In some embodiments, the computer 600 is incorporated into (or functionality similar to computer 600 is virtually provisioned to) any one or more of authenticator 102, mobile device 104, application 106 and/or the device initiating the authentication attempt 108.

Computer 600 includes memory 625, storage 630, interconnect 620 (e.g., BUS), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more busses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, any of the methods of FIGS. 3-5 and/or implementing any of the functionality discussed in FIGS. 1 and/or 2A-2B.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
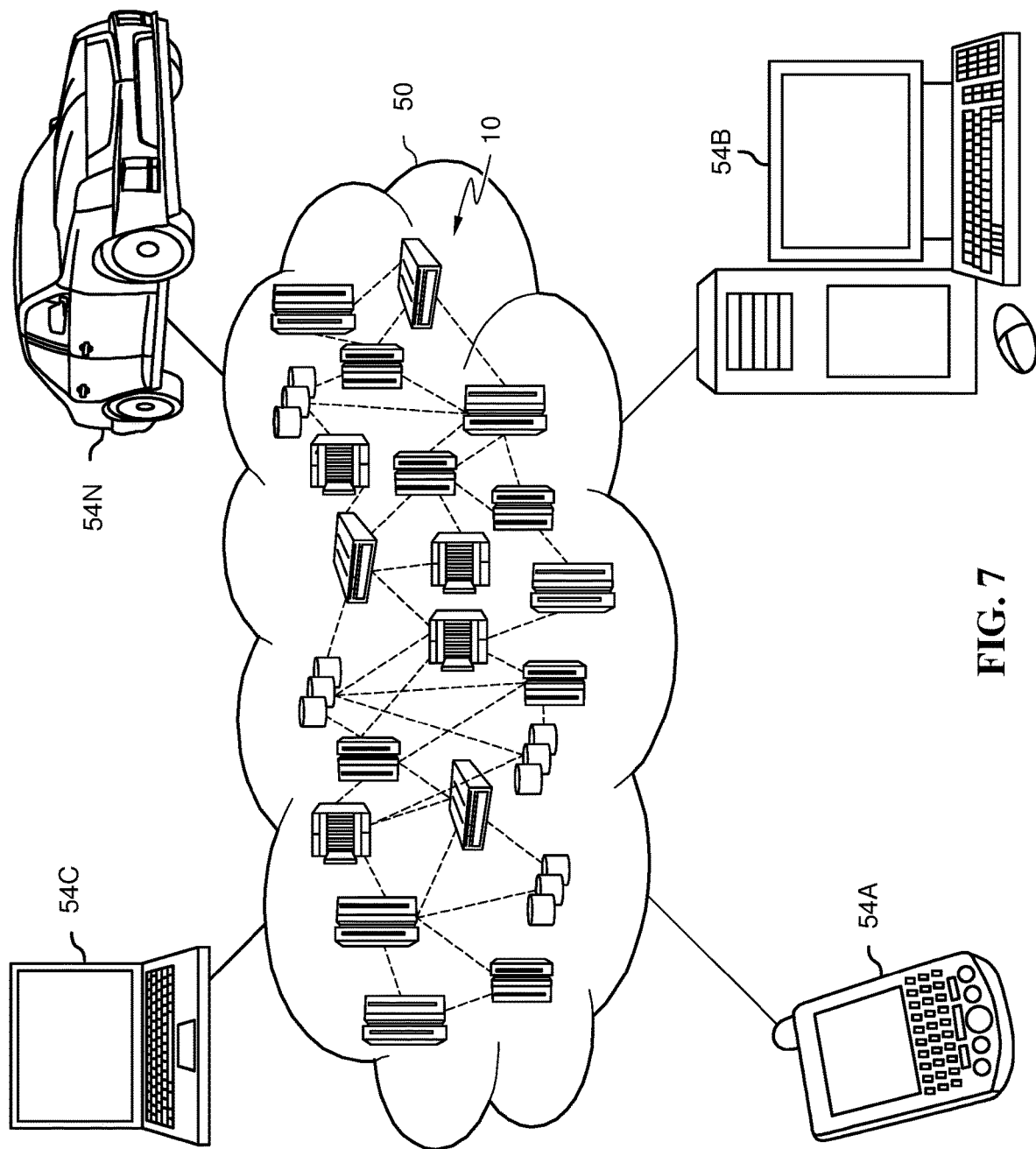
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
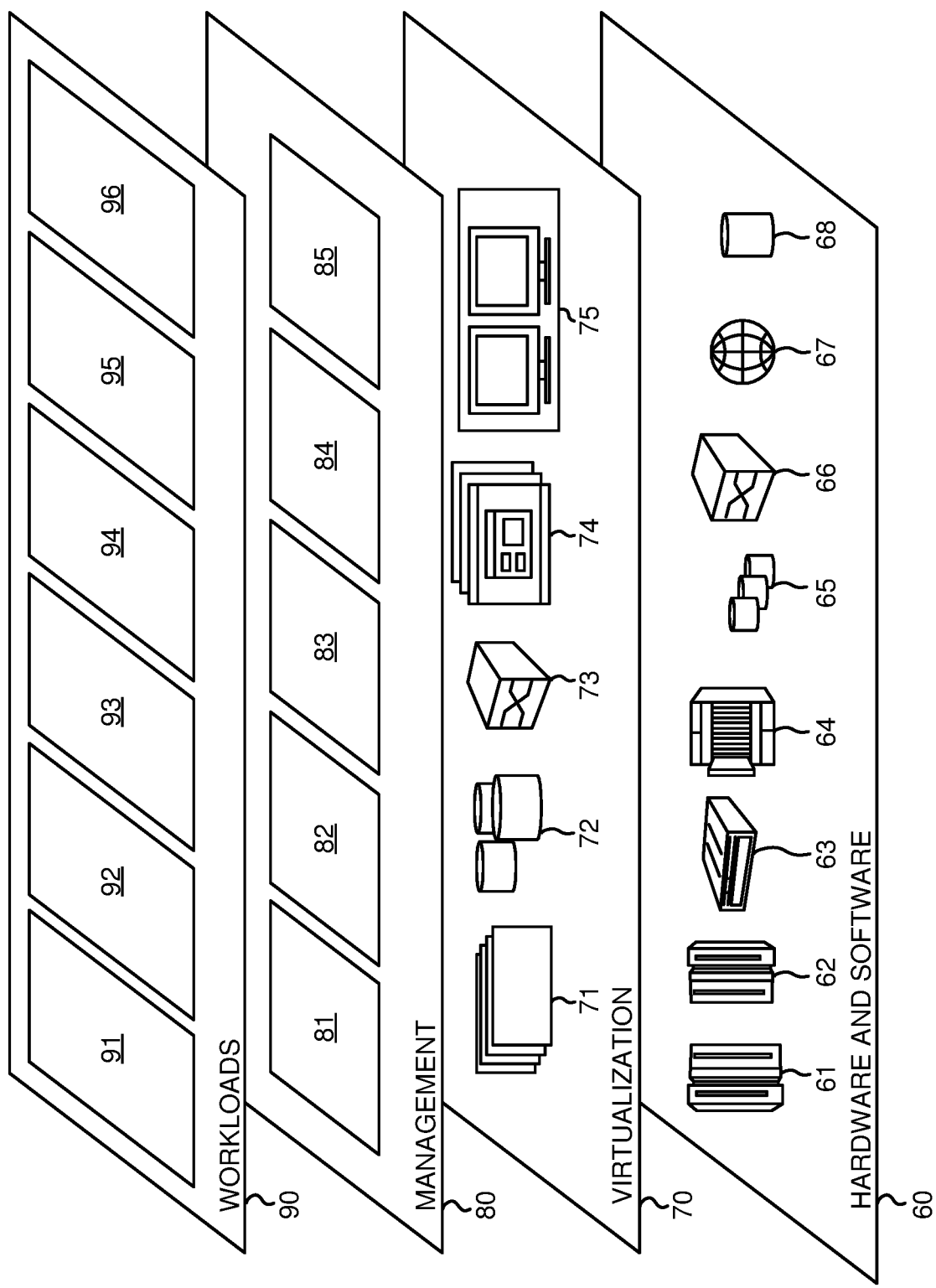
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and location corroboration-based authentication 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any subset of the methods described with respect to FIGS. 3-5 and/or any of the functionality discussed in FIGS. 1 and/or 2A-2B) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A method comprising:
   storing a user profile comprising information related to
      a user account,
      a plurality of user devices,
      and a user calendar;

detecting an authentication attempt associated with the user account;
retrieving
device information associated with a first device initiating the authentication attempt,
a first location of the first device initiating the authentication attempt,
a second location of a second device of the plurality of user devices,
and a scheduled location from the user calendar corresponding to a date and time when the authentication attempt occurred;
performing a device match by comparing the retrieved device information to respective corresponding device information of each of the plurality of user devices;
performing a location match by comparing the retrieved first location to a respective corresponding location of each of the plurality of user devices;
performing a schedule match by comparing the retrieved first location to the retrieved scheduled location;
determining that the authentication attempt comprises a security risk when:
the device match determines none of the respective corresponding device information match the retrieved device information,
the location match determines none of the respective corresponding locations match the retrieved first location, and
the schedule snatch determines that the retrieved scheduled location does not match the retrieved first location;
and performing a mitigation action in response to determining that the authentication attempt comprises the security risk.

2. The method of claim 1, wherein the device information associated with the first device includes a first media access control (MAC) address associated with the first device, and wherein determining that the authentication attempt comprises the security risk further comprises determining that the first MAC address of the first device does not match any MAC address of any device of the plurality of user devices.

3. The method of claim 1, wherein the device information associated with the first device includes a first International Mobile Equipment Identify (IMEI) number associated with the first device, and wherein determining that the authentication attempt comprises the security risk further comprises determining that the first IMEI number of the first device does not match any IMEI number of any device of the plurality of user devices.

4. The method of claim 1, wherein determining that the authentication attempt comprises the security risk further comprises determining that the first location of the first device is different from the second location of the second device by a first distance, and wherein the first distance is greater than a threshold distance.

5. The method of claim 1, wherein determining that the authentication attempt comprises the security risk further comprises determining that the first location of the first device is different from the scheduled location by a first distance, and wherein the first distance is greater than a threshold distance.

6. The method of claim 1, wherein determining that the authentication attempt comprises the security risk further comprises generating a score based on the device information associated with the first device, second device information associated with the second device, the first location, the second location, and the scheduled location.

7. The method of claim 6, wherein the score is based on: a similarity between the device information associated with the first device and the second device information associated with the second device; a first distance between the first location and the second location; and a second distance between the first location and the scheduled location.

8. The method of claim 1, wherein the mitigation action comprises issuing a notification to at least one of the plurality of user devices.

9. The method of claim 1, wherein the mitigation action comprises restricting access to the user account.

10. The method of claim 1, wherein the mitigation action comprises restricting access to the first device.

11. The method of claim 1, wherein the method is performed based on computer-executable instructions downloaded from a remote data processing system.

12. The method of claim 1, wherein the method further comprises:
metering usage of the method; and
generating an invoice based on the metered usage.

13. A system comprising: a processor; and a non-transitory computer-readable storage medium storing program instructions which, when executed by the processor, are configured to cause the processor to perform a method comprising:
storing a user profile comprising information related to a user account, a plurality of user devices, and a user calendar;
detecting an authentication attempt associated with the user account;
retrieving device information associated with a first device initiating the authentication attempt, a first location of the first device initiating the authentication attempt, a second location of a second device of the plurality of user devices, and a scheduled location from the user calendar corresponding to a date and time when the authentication attempt occurred;
performing a device match by comparing the retrieved device information to respective corresponding device information of each of the plurality of user devices;
performing a location match by comparing the retrieved first location to a respective corresponding location of each of the plurality of user devices;
performing a schedule match by comparing the retrieved first location to the retrieved scheduled location;
determining that the authentication attempt comprises a security risk when:
the device match determines none of the respective corresponding device information match the retrieved device information,
the location match determines none of the respective corresponding locations match the retrieved first location, and
the schedule match determines that the retrieved schedule location does not match the retrieved first location;
and performing a mitigation action in response to determining that the authentication attempt comprises the security risk.

14. The system of claim 13, wherein the device information associated with the first device includes a first identifier associated with the first device, and wherein determining that the authentication attempt comprises the security risk further comprises determining that the first identifier of the first device does not match any identifier of any device of the plurality of user devices.

15. The system of claim 13, wherein determining that the authentication attempt comprises the security risk further comprises:
- determining that the first location of the first device is different from the second location of the second device by a first distance, and wherein the first distance is greater than a first threshold distance; and
- determining that the first location of the first device is different from the scheduled location by a second distance, and wherein the second distance is greater than a second threshold distance.

16. The system of claim 13, wherein determining that the authentication attempt comprises the security risk further comprises generating a score based on:
- a similarity between the device information associated with the first device and second device information associated with the second device;
- a first distance between the first location and the second location; and
- a second distance between the first location and the scheduled location.

17. A computer program product comprising a non-transitory computer readable storage medium having program instructions embodied therewith, the program instructions executable by a processor to cause the processor to perform a method comprising:
- storing a user profile comprising information related to a user account, a plurality of user devices, and a user calendar;
- detecting an authentication attempt associated with the user account;
- retrieving device information associated with a first device initiating the authentication attempt, a first location of the first device initiating the authentication attempt, a second location of a second device of the plurality of user devices, and a scheduled location from the user calendar corresponding to a date and time when the authentication attempt occurred;
- performing a device match by comparing the retrieved device information to respective corresponding device information of each of the plurality of user devices;
- performing a location match by comparing the retrieved first location to a respective corresponding location of each of the plurality of user devices;
- performing a schedule match by comparing the retrieved first location to the retrieved scheduled location;
- determining that the authentication attempt comprises a security risk when:
  - the device match determines none of the respective corresponding device information match the retrieved device information,
  - the location match determines none of the respective corresponding locations match the retrieved first location; and
  - the schedule match determines that the retrieved schedule location does not match the retrieved first location;
- and performing a mitigation action in response to determining that the authentication attempt comprises the security risk.

18. The computer program product of claim 17, wherein the device information associated with the first device includes a first identifier associated with the first device, and wherein determining that the authentication attempt comprises the security risk further comprises determining that the first identifier of the first device does not match any identifier of any device of the plurality of user devices.

19. The computer program product of claim 17, wherein determining that the authentication attempt comprises the security risk further comprises:
- determining that the first location of the first device is different from the second location of the second device by a first distance, and wherein the first distance is greater than a first threshold distance; and
- determining that the first location of the first device is different from the scheduled location by a second distance, and wherein the second distance is greater than a second threshold distance.

20. The computer program product of claim 17, wherein determining that the authentication attempt comprises the security risk further comprises generating a score based on:
- a similarity between the device information associated with the first device and second device information associated with the second device;
- a first distance between the first location and the second location; and
- a second distance between the first location and the scheduled location.

* * * * *